(12) United States Patent
Nakamura et al.

(10) Patent No.: US 8,733,734 B2
(45) Date of Patent: May 27, 2014

(54) GATE VALVE

(75) Inventors: Kyuzo Nakamura, Chigasaki (JP);
Kouji Shibayama, Chigasaki (JP);
Shinichi Wada, Chigasaki (JP); Seiya Sakoda, Chigasaki (JP)

(73) Assignee: Ulvac, Inc., Chigasaki-Shi (JP)

( * ) Notice: Subject to any disclaimer, the term of this patent is extended or adjusted under 35 U.S.C. 154(b) by 87 days.

(21) Appl. No.: 13/393,804

(22) PCT Filed: Sep. 3, 2010

(86) PCT No.: PCT/JP2010/065144
§ 371 (c)(1),
(2), (4) Date: Mar. 1, 2012

(87) PCT Pub. No.: WO2011/027861
PCT Pub. Date: Mar. 10, 2011

(65) Prior Publication Data
US 2012/0161055 A1 Jun. 28, 2012

(30) Foreign Application Priority Data
Sep. 3, 2009 (JP) .................. 2009-204070

(51) Int. Cl.
*F16K 25/00* (2006.01)
(52) U.S. Cl.
USPC ........... 251/204; 251/174; 251/186; 251/328; 251/329
(58) Field of Classification Search
USPC .................. 251/174, 186, 193, 204, 328, 329
See application file for complete search history.

(56) References Cited

U.S. PATENT DOCUMENTS

| 5,271,426 A | * | 12/1993 | Clarkson et al. | 137/375 |
| 6,427,973 B1 | | 8/2002 | Wagner | |
| 6,776,394 B2 | * | 8/2004 | Lucas | 251/259 |

(Continued)

FOREIGN PATENT DOCUMENTS

| CN | 1987170 A | 6/2007 |
| CN | 101046258 A | 10/2007 |

(Continued)

OTHER PUBLICATIONS

Office Action from corresponding Chinese Application No. 201080038814.4 dated Mar. 27, 2013. English translation attached.

(Continued)

*Primary Examiner* — John K Fristoe, Jr.
*Assistant Examiner* — Matthew W Jellett
(74) *Attorney, Agent, or Firm* — Grossman, Tucker, Perreault & Pfleger, PLLC

(57) ABSTRACT

A gate valve includes: a valve box; a support body disposed inside a hollow portion; a valve plate including a fixed valving section, a movable valving section sliding in a direction in which a flow passage is extended, a first peripheral region; and a second peripheral region; a first biasing section disposed at the first peripheral region, allowing the movable valving section to move toward a first opening portion, allowing the movable valving section to come into contact with an inner surface, pressing the movable valving section onto the inner surface, and closing the flow passage; and a second biasing section disposed at the second peripheral region, allowing the movable valving section to move toward a second opening portion, and releasing the flow passage by separating the movable valving section from the inner surface.

10 Claims, 6 Drawing Sheets

(56) References Cited

U.S. PATENT DOCUMENTS

| | | | |
|---|---|---|---|
| 6,854,708 B2 * | 2/2005 | Contin et al. | 251/167 |
| 6,863,256 B2 * | 3/2005 | Lucas | 251/159 |
| 6,902,145 B2 * | 6/2005 | Latzer et al. | 251/170 |
| 7,278,444 B2 * | 10/2007 | Lucas et al. | 137/599.18 |
| 7,413,162 B2 | 8/2008 | Geiser | |
| 7,654,505 B2 * | 2/2010 | Schoen | 251/200 |
| 7,658,367 B2 * | 2/2010 | Geiser | 251/301 |
| 7,802,772 B2 * | 9/2010 | Geiser | 251/301 |
| 2004/0079915 A1 * | 4/2004 | Contin et al. | 251/167 |
| 2009/0127487 A1 * | 5/2009 | Iwabuchi | 251/193 |

FOREIGN PATENT DOCUMENTS

| | | |
|---|---|---|
| CN | 101109452 A | 1/2008 |
| CN | 101208551 A | 6/2008 |
| JP | 48-88514 | 11/1973 |
| JP | 56-90165 | 7/1981 |
| JP | 61-127987 | 6/1986 |
| JP | 2002-502946 | 1/2002 |
| JP | 2002-181205 | 6/2002 |
| JP | 2004-225878 | 8/2004 |
| JP | 3655715 B2 | 6/2005 |
| JP | 3655715 | 3/2006 |
| JP | 2007-271080 | 10/2007 |

OTHER PUBLICATIONS

International Search Report from corresponding PCT Application No. PCT/JP2010/065144 dated Nov. 16, 2010.

* cited by examiner

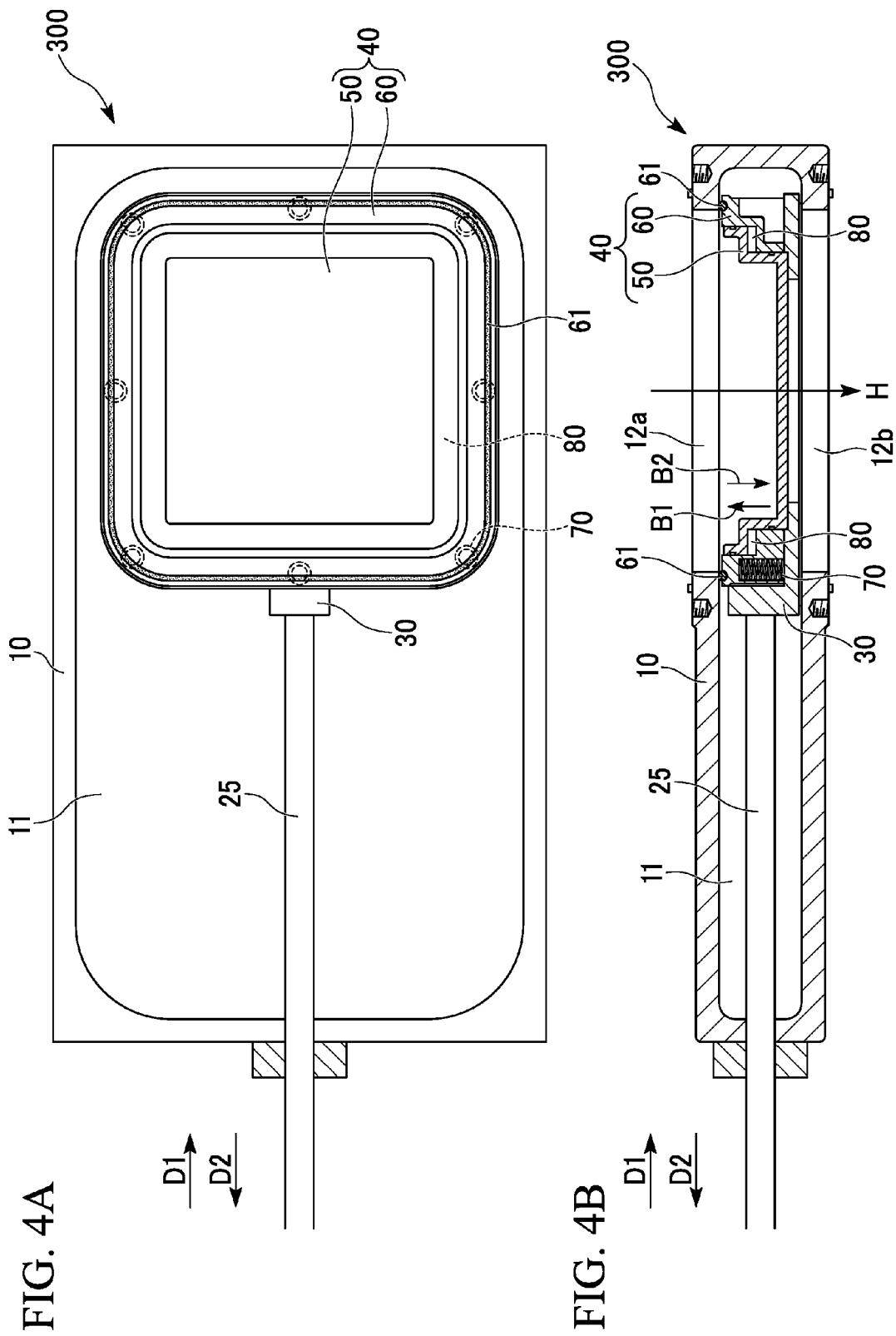

GATE VALVE

CROSS-REFERENCE TO RELATED APPLICATION

This is the U.S. National Phase Application under 35 U.S.C. §371 of International Patent Application No. PCT/JP2010/065144 filed Sep. 3, 2010, which designated the United States and was published in a language other than English, which claims the benefit of Japanese Patent Application No. 2009-204070 filed on Sep. 3, 2009, both of them are incorporated by reference herein. The International Application was published in Japanese on Mar. 10, 2011 as WO2011/027861 A1 under PCT Article 21(2).

BACKGROUND OF THE INVENTION

1. Field of the Invention

The present invention relates to a gate valve which is suitable for use in a pendulum valve, a direct acting valve, a door valve, or the like, which slidably operates a valve plate in addition to an operation of opening and closing a flow passage using the valve plate.

Particularly, the present invention relates to a gate valve which separates (closes) flow passage communicating two spaces in which the vacuum degrees thereof (including atmospheric pressure) are different from each other in a vacuum apparatus or the like and which releases this separated state (communicates the two spaces).

2. Background Art

Gate valves are provided in a vacuum apparatus or the like, and the gate valves separate two spaces in which the vacuum degrees thereof are different from each other such as between a chamber and pipes, between pipes, between a pipe and a pump, or the like; and the gate valves communicate the two spaces.

As such a gate valve, various valves are known.

For example, a structure is known in which a valve plate is inserted into a valve opening-closing position of a flow passage by sliding a valve plate, furthermore, the flow passage is separated (valve closing operation) or two flow passages are communicated by operating the aforementioned valve plate (valve opening operation) by operating this valve plate. Additionally, the valve plate is moved to a safety position located in a valve box from the flow passage by sliding the valve plate.

As a valve having such a structure, a pendulum valve, a direct acting valve, a door valve, or the like is known.

A direct acting gate valve has a constitution in which a valve plate is disposed in a hollow portion of a valve box. A first opening portion and a second opening portion constituting a flow passage are formed at the valve box. The valve plate is securely fixed to a valve rod (support body).

In this structure, the aforementioned valve plate is inserted into the valve opening-closing position of the opening portion (flow passage) by moving straight the aforementioned valve rod in the longitudinal direction thereof, or the aforementioned valve plate is moved to the safety position at which the opening portion is not formed.

As a conventional direct acting gate valve, a gate valve is known which is provided with a valving element that is constituted of two of a first valve plate and a second valve plate which are connected to each other with bellows interposed therebetween, an actuator be disposed at the center portion of the valve plate between these two valve plates, and a valve box at which an opening portion constituting the flow passage is formed.

In this gate valve, the flow passage is closed due to the first valve plate coming in contact with and pressing onto the peripheral inner surface of the opening portion of the valve box by operating the actuator, or the flow passage is released due to separating the first valve plate from the inner surface of the aforementioned valve box by operating the actuator (for example, refer to Japanese Unexamined Patent Application, First Publication No. 2002-181205).

Additionally, a pendulum gate valve has a constitution in which a valve box having a hollow portion, a support body, and a valving element (a valve plate in the case of the structure in which a seal ring plate is provided at an opening portion) which is securely fixed to this support body. In the valve box, a first opening portion and a second opening portion constituting a flow passage are formed. The support body is securely fixed to a rotation shaft in the hollow portion and is expanded in a direction parallel to the plane perpendicular to the rotation shaft.

In this gate valve, the aforementioned valving element is turned by rotating the aforementioned rotation shaft, therefore, the above-described valving element is inserted into the valve opening-closing position of the opening portion (flow passage) or the above-described valving element is moved to the safety position at which the opening portion is not formed.

As a conventional pendulum gate valve, a constitution is known in which a valve plate that is capable of rotating around a rotation shaft in a hollow portion of a housing, a slidable seal ring plate that is disposed at an opening portion of the housing, and an actuator allowing the aforementioned seal ring plate to slide on a flange formed integrally with the housing are provided.

In this gate valve, the flow passage is closed due to the aforementioned seal ring plate coming in contact with and pressing onto the aforementioned valve plate, or the flow passage is released by separating the aforementioned seal ring plate from the aforementioned valve plate (for example, refer to Japanese Patent No. 3655715).

The actuator provided in this pendulum gate valve has a structure in which a bolt, a ring-shaped chamber (cylinder), a piston, and a spring are arranged in series in the sliding direction of the seal ring plate.

For this reason, when the flow passage is being closed, the restorative force generated in the spring is transmitted to the seal ring plate through the piston, the cylinder, and the bolt.

Additionally, a door gate valve has a constitution in which a valve box having a hollow portion, a support body, and a valving element which is securely fixed to this support body. In the valve box, a first opening portion and a second opening portion constituting a flow passage are formed. The support body is securely fixed to a valve shaft and is expanded in a direction parallel to the plane including the valve shaft.

In this gate valve, the above-described valving element is rotated by rotating the aforementioned valve shaft, the above-described valving element is inserted into the valve opening-closing position of the opening portion (flow passage) or, the above-described valving element is moved to the safety position which is substantially perpendicular to the opening portion.

In the foregoing gate valve, for the requirement of making the overall structure of the gate valve compact, it is necessary to simplify the structure of the valving element and to ensure the reliability of separating operation.

However, in conventional valves as described above, since the actuator is disposed at the center portion of the valve plate, a high level of rigidity in the valve plate is required for transmitting a sufficient pressing force to the surface of the valve plate which seals a space as a practical matter.

If the rigidity in the valve plate is insufficient, there are problems in that it is not possible to reliably separate spaces and a high level of reliability cannot be obtained.

Furthermore, in the above-described conventional valves, a structure connecting two valve plates is adopted.

Since this connection structure and the actuator are individual components, there is a problem in that the structure of the valving element becomes complicated.

Moreover, in a large-diameter valve, a cylinder which produces great power is necessary for resisting the back pressure, and there is a problem in that the valving element becomes larger.

Additionally, in the above-described conventional pendulum gate valve, an actuator allowing the seal ring to slide is provided at a flange, and this actuator, a ring-shaped cylinder, and a spring are arranged in series.

Consequently, the surface of the valve plate which actually seals a space is positioned inside of the actuator, this surface is displaced from the position of the actuator, furthermore, a pressing force by the spring (restorative force of spring) is transmitted to this surface through the piston, the cylinder, and the bolt.

For this reason, if this pressing force is insufficient, there are problems in that it is not possible to reliably separate spaces and a high level of reliability cannot be obtained.

In addition, in order to resist the back pressure in a large-diameter valve or to apply a valve plate, a seal ring plate, a flange having a particular kind of configuration, it is necessary to arrange a plurality of actuator components excluding a cylinder, and there is a problem in that the constitution of the gate valve becomes complicated.

SUMMARY OF THE INVENTION

The invention was made in order to solve the above conventional problems, and has an object to provide a gate valve which has a simple constitution and which can realize a separating operation with a high level of reliability.

A gate valve of an aspect of the invention includes: a valve box including: a hollow portion; a first opening portion and a second opening portion that are provided so as to sandwich the hollow portion; an inner surface formed around the first opening portion; and a flow passage passing through the hollow portion, the first opening portion, and the second opening portion; a support body disposed inside the hollow portion; a valve plate including: a fixed valving section that is securely fixed to the support body; a movable valving section disposed so as to surround the outer-periphery of the fixed valving section; a first peripheral region; and a second peripheral region, the movable valving section sliding in a direction in which the flow passage is extended; a first biasing section disposed at the first peripheral region, allowing the movable valving section to move toward the first opening portion, allowing the movable valving section to come into contact with the inner surface, pressing the movable valving section onto the inner surface, and closing the flow passage; and a second biasing section disposed at the second peripheral region, allowing the movable valving section to move toward the second opening portion, and releasing the flow passage by separating the movable valving section from the inner surface.

Additionally, in the gate valve of the aspect of the invention, it is preferable that the movable valving section include a first seal portion which is in contact with the inner surface and is pressed onto the inner surface, and the first biasing section be an elastic element (self-elastic element) provided directly blow the first seal portion in the movable valving section.

Additionally, in the gate valve of the aspect of the invention, it is preferable that the second biasing section be a single air cylinder which is formed between the fixed valving section and the movable valving section in the second peripheral region and which is ring-shaped.

Additionally, in the gate valve of the aspect of the invention, it is preferable that the first biasing section be arranged in parallel with a direction in which the movable valving section slides and so as to approximate the second biasing section.

Additionally, in the gate valve of the aspect of the invention, it is preferable that the fixed valving section include a second seal portion, a third seal portion, and a wiper, and the wiper be disposed at a position which is closer to the second opening portion than the third seal portion.

Effects of the Invention

In the gate valve of the aspect of the invention, the valve plate is constituted of the fixed valving section and the movable valving section.

Furthermore, the first biasing section causes the movable valving section to transfer toward the first opening portion, causes the movable valving section to come into contact with the inner surface, presses the movable valving section onto the inner surface, and closes the flow passage.

Additionally, the second biasing section causes the movable valving section to transfer toward the second opening portion, separates the movable valving section from the inner surface, and thereby releases the flow passage.

With this configuration, it is possible to form a valving element by use of one valve plate and two biasing sections.

Additionally, the first biasing section transfers the movable valving section and can directly and reliably close the gate valve.

Moreover, the second biasing section transfers the movable valving section and can directly and reliably open the gate valve.

Because of this, the effect is obtained that it is possible to obtain a gate valve performing a separating operation with a high level of reliability and with a simple constitution.

BRIEF DESCRIPTION OF THE DRAWINGS

FIG. 4A is a horizontal cross-sectional view showing the constitution of a gate valve of a third embodiment of the invention.

FIG. 4B is a vertical cross-sectional view showing the constitution of the gate valve of the third embodiment of the invention and is a view showing the case where a valving element is placed at a valve opening-closing position.

DESCRIPTION OF THE PREFERRED EMBODIMENTS

Figure 1A:
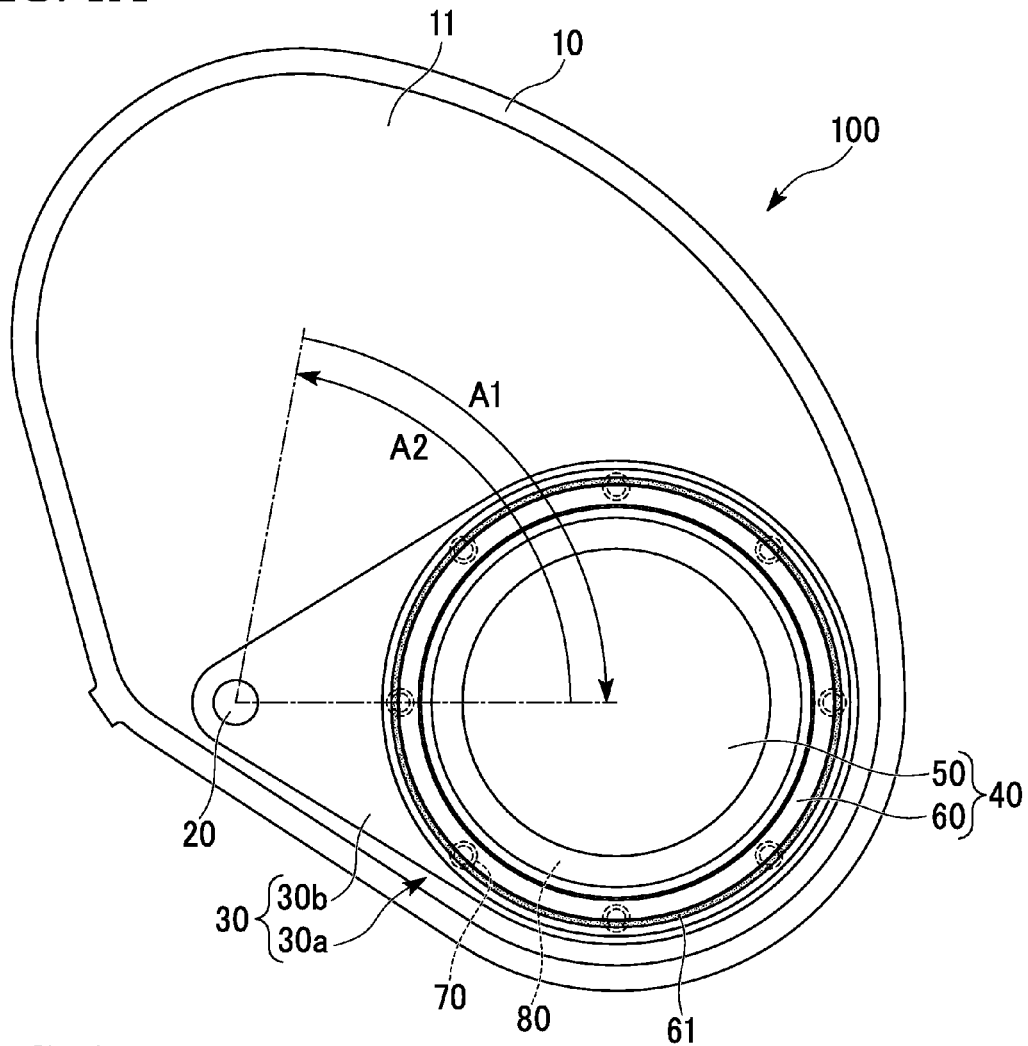
FIG. 1A is a horizontal cross-sectional view showing the constitution of a gate valve of a first embodiment of the invention.

Hereinafter, embodiments of gate valves of related to the invention will be described with reference to drawings.

In the drawings used for explanation described below, in order for the respective components to be of understandable size in the drawings, the dimensions and the proportions of the components are modified as needed compared with the real components.

The technical scope of the invention is not limited to the embodiments which will be described below, but various modifications may be made without departing from the scope of the invention.

First Embodiment

Figure 1B:
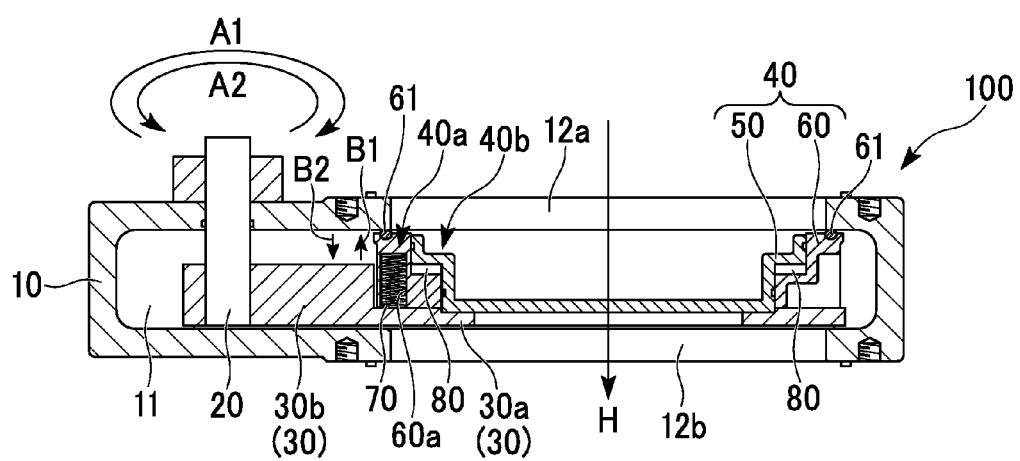
FIG. 1B is a vertical cross-sectional view showing the constitution of the gate valve of the first embodiment of the invention and is a view showing the case where a valving element is placed at a valve opening-closing position.

FIGS. 1A and 1B are views illustrating the constitution of a gate valve of a first embodiment of the invention.

FIG. 1A is a horizontal cross-sectional view showing the gate valve, and FIG. 1B is a vertical cross-sectional view showing the gate valve in the case where a valving element is placed at a valve opening-closing position.

A gate valve 100 of the first embodiment is provided with a valve box 10, a rotation shaft 20, a support body 30, a valve plate 40, first biasing sections 70, and a second biasing section 80.

The support body 30 and the valve plate 40 constitute the valving element.

Additionally, the valve plate 40 is constituted of the fixed valving section 50 (fixed valve plate section) and the movable valving section 60 (movable valve plate section).

[Pendulum Gate Valve]

The gate valve 100 of the first embodiment is a pendulum gate valve.

When the rotation shaft 20 is rotated in the direction (direction which intersects with the direction of the flow passage H) represented by reference numeral A1, the support body 30 also rotates in the direction A1 along with this rotation.

Additionally, since the valve plate 40 is provided at the support body 30, the valve plate 40 rotates with the support body 30 in an integrated manner.

Due to the rotation of the support body 30 in the above-described manner, the valve plate 40 is inserted into a valve opening-closing position of the flow passage H from a safety position at which the flow passage H is not provided.

Consequently, the valve plate 40 closes the flow passage H by operating the first biasing sections 70 (valve closing operation).

Conversely, after the valve plate 40 is opened by operating the second biasing section 80 (valve opening operation), when the rotation shaft 20 is rotated in the direction indicated by reference numeral A2, the support body 30 is also rotated in the direction A2 according to this rotation.

For this reason, the valve plate 40 moves to the safety position from the aforementioned valve opening-closing position.

[Valve Box 10]

The valve box 10 is constituted of a frame having a hollow portion 11.

A first opening portion 12a is provided on the upper face of the frame, and a second opening portion 12b is provided on the lower face of the frame.

The gate valve 100 is to be inserted between a space (first space) to which the first opening portion 12a is exposed and a space (second space) to which the second opening portion 12b is exposed.

The gate valve 100 separates (closes) the flow passage H communicating the first opening portion 12a to the second opening portion 12b, that is, the flow passage H communicating the first space to the second space, and releases this separated state (communicates the first space to the second space).

In the hollow portion 11 of the valve box 10, the rotation shaft 20, the support body 30, the valve plate 40, the first biasing sections 70, and the second biasing section 80 are provided.

[Rotation Shaft 20 and Support Body 30]

The rotation shaft 20 is rotatably provided at the valve box 10.

The support body 30 is securely fixed to this rotation shaft 20.

The support body 30 has a surface which is parallel to the direction vertical to the rotation shaft 20.

As shown in FIG. 1A, the support body 30 has a circular portion 30a that overlaps the valve plate 40 and a rotation portion 30b that causes the circular portion to be rotated along with the rotation of the rotation shaft 20.

The rotation portion 30b is located between the rotation shaft 20 and the circular portion 30a, and the width of the rotation portion 30b gradually increases in the direction from the rotation shaft 20 to the circular portion 30a.

[Valve Plate 40, Fixed Valving Section 50, and Movable Valving Section 60]

The valve plate 40 has the fixed valving section 50 which is formed in substantially a concentric shape and the substantially ring-shaped movable valving section 60 which is disposed so as to surround the periphery of this fixed valving section 50.

The fixed valving section 50 is securely fixed to the support body 30.

Furthermore, the fixed valving section 50 is fitted into the movable valving section 60 and is movable so as to slide on the fixed valving section 50 by operating the first biasing sections 70 and the second biasing section 80 in the directions indicated by reference numerals B1 and B2 (reciprocating direction).

Here, the directions indicated by reference numerals B1 and B2 are the directions perpendicular to the surfaces of the support body 30 and the fixed valving section 50 and are the directions parallel to the axial direction of the rotation shaft 20.

Additionally, an outer-crank portion is formed on the entire region around the outer-periphery of the fixed valving section 50.

Furthermore, an inner-crank portion is formed on the entire region around the inner-periphery of the movable valving section 60.

In the first embodiment, the outer-crank portion of the fixed valving section 50 is slidably fitted onto the inner-crank portion of the movable valving section 60.

A first seal portion 61 (main seal portion), which is formed in a ring-shape, for example, constituted of an O-ring or the like, is provided on the surface of the movable valving section 60 facing the inner surface of the valve box 10 (coming in contact with the inner surface).

The first seal portion 61 is in contact with the inner surface of the valve box 10 in a state where the first opening portion 12a is covered with the valve plate 40 when the valve is being closed, and the first seal portion 61 is pressed by the movable valving section 60 and the inner surface of the valve box 10.

Because of this, the first space is reliably isolated from the second space (separated state is ensured).

[First Biasing Section 70 (Elastic Element)]

The first biasing sections 70 are arranged at a first peripheral region 40a of the valve plate 40.

In the first biasing sections 70, a restorative force is generated so as to press the movable valving section 60 onto the first opening portion 12a (in the direction B1).

Consequently, the first biasing sections 70 apply a force to the movable valving section 60 (bias), presses the movable valving section 60 onto the inner surface of the valve box 10 which is located around the first opening portion 12a, and causes this inner surface to come into contact with the movable valving section 60.

In the first embodiment, the first biasing sections 70 are formed of an elastic element (e.g., a spring, a rubber, a sealed air damper, or the like) which is provided at a depressed portion 60a of the movable valving section 60.

The first biasing section 70 has a first end and a second end.

The first end is in contact with the ceiling face of the depressed portion 60a of the movable valving section 60.

The second end is in contact with the support body 30.

Additionally, in the ring-shaped movable valving section 60 as shown in FIG. 1A, a plurality of first biasing sections 70 are provided along a circumferential direction.

The natural length of the elastic element constituting the first biasing sections 70 is longer than the depth of the above-described depressed portion 60a.

Consequently, an elastic restorative force (extending force, biasing force) is generated in the first biasing section 70 which is disposed inside the depressed portion 60a while being compressed by the ceiling face of the depressed portion 60a and the support body 30.

Due to the action of this elastic restorative force, the first seal portion 61 comes into contact with the inner surface of the valve box 10 and is pressed by the inner surface while the movable valving section 60 slides in the direction B1, and the valve closing operation is performed.

It is desirable that the first biasing sections 70 be arranged directly under the first seal portion 61 in order to be able to directly press the first seal portion 61.

In the gate valve 100, since the first biasing sections 70 are provided at the movable valving section 60, the first biasing sections 70 can be located directly below the first seal portion 61.

In the structure of the gate valve 100, the first biasing sections 70 are located directly below the foregoing first seal portion 61.

As described above, in the gate valve 100, as an actuator performing the valve closing operation and the valve opening operation, the first biasing sections 70 performing the valve closing operation and the second biasing section 80 performing the valve opening operation (which will be described later) are provided.

In this configuration, the first biasing sections 70 and the second biasing section 80 are arranged in parallel so as to be located adjacent to each other at the peripheral regions of the valve plate 40 (the first peripheral region and the second peripheral region) which are close to the first seal portion 61.

Additionally, the first biasing sections 70 are located directly below the first seal portion 61.

In this constitution, the first biasing sections 70 can directly press the first seal portion 61, and can directly apply a load onto the first seal portion 61 in substantially a vertical direction.

That is, the structure of the gate valve 100 is not a structure applying a moment load in which a point of application of force and a fulcrum point exist.

For this reason, components of structural members (strength) corresponding to a lever are not necessary, and it is possible to simplify the structure of the actuator.

Moreover, as long as the movable valving section 60 has the strength required for supporting the weight of the movable valving section 60, the rigidity required for the movable valving section 60 is sufficiently obtained.

Furthermore, even when electrical power (power supply), which is to be supplied to an apparatus provided with the gate valve 100 from a utility system, is shut down due to electricity failure or the like, since the first biasing sections 70 are arranged directly below the first seal portion 61, it is possible to reliably close the gate valve 100 by the action of only the mechanical force generated in the first biasing sections 70.

Accordingly, it is possible to reliably realize a fail-safe gate valve.

On the other hand, in the gate valve having the structure in which a valve closing operation is carried out by utilizing energy such as electrical power or the like supplied from a utility system, there is a case where it is not possible to carry out the valve closing operation if power supply from the utility system to the apparatus is shut down.

Accordingly, in such a structure, it is not possible to realize a fail-safe gate valve.

[Second Biasing Section 80 (Air Cylinder)]

The second biasing section 80 is disposed at a second peripheral region 40b of the valve plate 40.

In the second biasing section 80, when compressed air is supplied to the second biasing section 80, a force (biasing force, the force due to the compressed air) is generated so as to transfer the movable valving section 60 to the second opening portion 12b (in direction B2).

Consequently, the movable valving section 60 is separated from the inner surface of the valve box 10 which is located around the first opening portion 12a.

Particularly, the second peripheral region 40b is located inside the first peripheral region 40a in the valve plate 40.

That is, the second biasing section 80 is disposed at the internal side of the first biasing sections 70 in the radial direction of the valve plate 40.

In other words, the first biasing sections 70 are located adjacent to the second biasing section 80 in the direction intersecting with the direction in which the movable valving section 60 slides.

In the first embodiment, the second biasing section 80 is a single air cylinder (air space) which is provided between the fixed valving section 50 and the movable valving section 60.

Specifically, this air cylinder is formed between a second outer-peripheral face 50c of the fixed valving section 50 (which will be described below) and "first inner-peripheral face 60b", a first inner-peripheral face 60b of the movable valving section 60 (which will be described below) and is formed between the outer-crank portion and the inner-crank portion.

Furthermore, this air cylinder is a ring-shaped space which is formed around the fixed valving section 50, and the air cylinder functions as a single circular ring-shaped cylinder (circular ring-shaped air space).

In other words, the circular ring-shaped cylinder is formed so as to surround the flow passage H.

When compressed air is supplied to the second biasing section 80, an expansive force (biasing force) that expands the volume of the second biasing section 80 is generated in the direction B2.

When the magnitude of the expansive force is greater than the restorative force (the biasing force generated in the direction B1) generated in the first biasing sections 70, the first biasing sections 70 are compressed, the movable valving section 60 slides in the direction B2, the first seal portion 61 moves separately from the inner surface of the valve box 10, and the valve opening operation is thereby performed.

As remarked above, as an actuator performing the valve closing operation and the valve opening operation, the first biasing sections 70 performing the valve closing operation and the second biasing section 80 performing the valve opening operation are provided in the gate valve 100.

In this configuration, the first biasing sections 70 and the second biasing section 80 are arranged in parallel so as to be located adjacent to each other at the peripheral regions of the valve plate 40 which are close to the first seal portion 61.

The second biasing section 80 constitutes a single circular ring-shaped cylinder which is provided between the fixed valving section 50 and the movable valving section 60.

With this configuration, as long as one air cylinder to which compressed air is unidirectionally supplied is provided at the second biasing section 80, it is possible to supply the compressed air to the inside of the circular ring-shaped cylinder along the configuration of the circular ring-shaped cylinder, and the valve opening operation and the valve closing operation can be carried out.

Accordingly, it is possible to achieve an actuator having a simplified and compact constitution.

Moreover, the second biasing section 80 is used for performing the valve opening operation; therefore, as long as the first biasing sections 70 can be compressed by the action of the force which is to be generated in the second biasing section 80, the magnitude (output) of the force is sufficiently obtained.

In the first embodiment, since the fixed valving section 50 and the movable valving section 60 constitute single valve plate 40, it is not necessary to provide two valve plates, and a valve plate having a simplified and compact constitution can be realized.

In addition, the force generated by the actuator is not operated in the fixed valving section 50.

For this reason, as long as the fixed valving section 50 has a strength such that deflection is generated in the range of elastic deformation even where the back pressure is operated, the rigidity of the fixed valving section 50 is sufficiently obtained.

In other cases, a structure can also be adopted in which the fixed valving section 50 is integrated together with the support body 30.

In this structure, as long as the structure has the strength required for supporting the weight of the movable valving section 60 (the strength of the supporting structure in which the fixed valving section 50 is integrated together with the support body 30) when the valve plate 40 rotates between the safety position and the valve opening-closing position in addition to the strength of the above-described fixed valving section 50, the rigidity of this structure is sufficiently obtained.

Furthermore, in the first embodiment, since the first biasing sections 70 performing the valve closing operation and the second biasing section 80 performing the valve opening operation are arranged at the peripheral region of the valve plate 40 close to the first seal portion 61, it is necessary to provide an actuator at the valve box 10, and it is possible to realize a gate valve having a simple constitution.

Moreover, the first biasing sections 70 are arranged directly below the first seal portion 61 of the movable valving section 60 in the structure of the first embodiment, and the second biasing section 80 is constituted of single circular ring-shaped cylinder which is provided between the fixed valving section 50 and the movable valving section 60.

In this structure, the constitution of the actuator can also be simplified, and it is possible to improve the reliability of the valve closing operation and the valve opening operation.

Additionally, even where the structure, in which the actuator is disposed at the peripheral region of the valve plate 40 as stated above, is applied to a gate valve having a large diameter opening, it is possible to reliably carry out the valve closing operation and the valve opening operation by use of the same structure as in the above-described case, and it is possible to carry out the same operation as in the above-described case even where the back pressure is operated.

Figure 2:
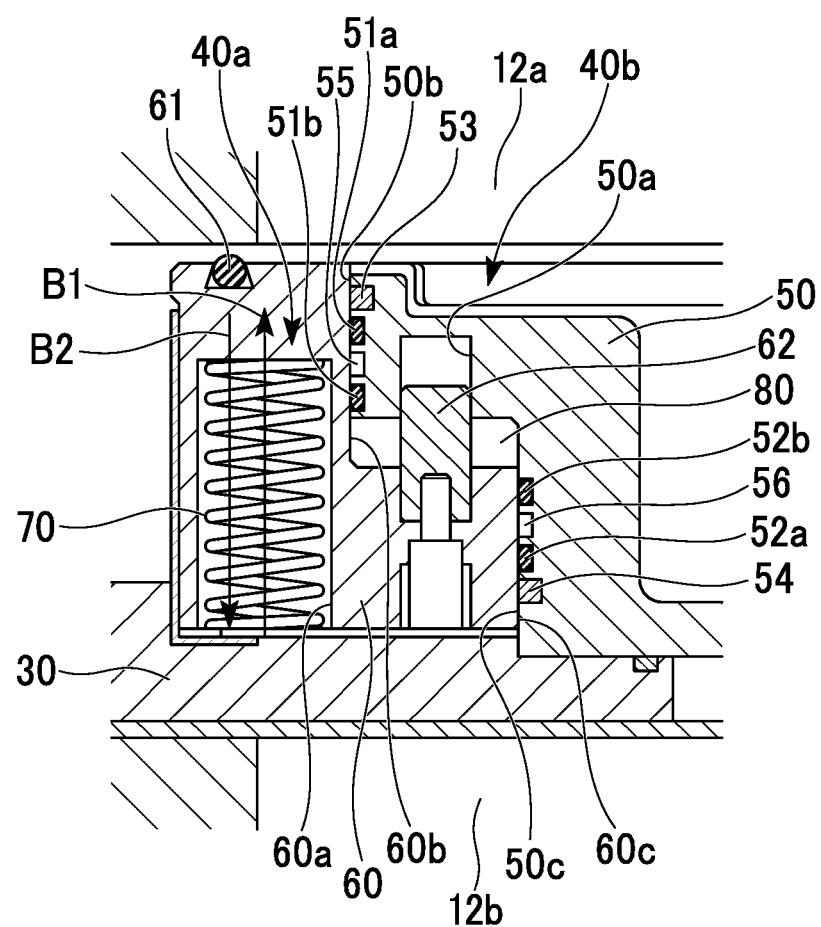
FIG. 2 is an enlarged vertical cross-sectional view showing the portion at which a fixed valving section is fitted to a movable valving section in the gate valve of the first embodiment of the invention.

FIG. 2 is an enlarged vertical cross-sectional view showing the portion at which the fixed valving section 50 and the movable valving section 60 are fitted to each other, and showing the portion at which the first biasing sections 70 and a guide pin are provided.

[Second Seal Portions 51a and 51b and Third Seal Portions 52a and 52b]

Second seal portions 51a and 51b and third seal portions 52a and 52b such as an O-ring or the like which are annular are provided at the outer-peripheral face of the fixed valving section 50. The second seal portions 51a and 51b and the third seal portions 52a and 52b come into contact with the inner-peripheral face of the movable valving section 60 and seal between the fixed valving section 50 and the movable valving section 60.

Specifically, the second seal portions 51a and 51b are provided at the first outer-peripheral face 50b which is located on the outer side in the radial direction and on the outer-crank portion of the fixed valving section 50.

Furthermore, the second outer-peripheral face 50c is located at the inside of the first outer-peripheral face 50b in the radial direction and under the second seal portions 51a and 51b, the third seal portions 52a and 52b are provided on the second outer-peripheral face 50c.

The second seal portions 51*a* and 51*b* are in contact with the first inner-peripheral face 60*b* of the movable valving section 60, and the third seal portions 52*a* and 52*b* are in contact with a second inner-peripheral face 60*c*. The second inner-peripheral face 60*c* is located under the first inner-peripheral face 60*b* of the movable valving section 60.

The second seal portions 51*a* and 51*b* separate the second biasing section 80 which is a high pressure space from the first space which is a low pressure space or the like and which is close to the first opening portion 12*a*, and ensures a separated state.

Similarly, the third seal portions 52*a* and 52*b* separate the second biasing section 80 which is a high pressure space from the second space which is a low pressure space or the like and which is close to the second opening portion 12*b*, and ensures a separated state.

[Guide Pin 62]

A guide pin 62 is securely fixed to the movable valving section 60, penetrates through the second biasing section 80, and is fitted to a depressed portion 50*a* formed in the fixed valving section 50.

The guide pin 62 guides the movable valving section 60 so as not to displace the movable valving section 60 from the sliding directions indicated by reference numerals B1 and B2.

For this reason, the movable valving section 60 is prevented from transferring in the diagonal direction with respect to the direction of reference numerals B1 and B2.

In this structure, while the position of the movable valving section 60 is being aligned with respect to the fixed valving section 50, the movable valving section 60 moves in parallel with the direction indicated by reference numerals B1 and B2, and it is possible to carry out the valve closing operation and the valve opening operation.

Accordingly, when a valve opening operation is performed, a pressing force is uniformly generated onto the first seal portion 61 which is provided at the movable valving section 60, and it is thereby possible to realize a sealing structure inhibiting leakage.

Additionally, in the structure provided with the guide pin 62 as mentioned above, in the case where the positions at which the gate valve 100 are attached to a vacuum apparatus are not determined, that is, in the case where the attachment direction of the gate valve 100 can be freely determined, it is possible to prevent the load, which is the weight of the movable valving section 60, from being locally applied to the second seal portions 51*a* and 51*b* and the third seal portions 52*a* and 52*b*.

For example, in the case where the gate valve 100 is assembled such that the gravitational force is operated in a direction perpendicular to the direction in which the movable valving section 60 slides, the weight of the movable valving section 60 serving as a sliding component is applied to the guide pin 62.

Because of this, the weight of the movable valving section 60 is prevented from being directly applied to the second seal portions 51*a* and 51*b* and the third seal portions 52*a* and 52*b* (O-ring).

Accordingly, even where the gate valve 100 is attached to any positions, the product life of the seal portion is not shortened, and it is possible to ensure effect of preventing leakage.

In order to reduce the surface area of the sliding surface between the guide pin 62 and the depressed portion 50*a* and in order to isolate the guide pin 62 from the first space and the second space, the guide pin 62 is disposed so as to penetrate through the inside of the second biasing section 80.

Additionally, since the guide pin 62 is disposed inside the second biasing section 80, the movable valving section 60 can smoothly slide on the fixed valving section 50.

Particularly, as long as the strength of the guide pin is sufficiently-obtained, the direction in which the movable valving section 60 slides is prevented from being misaligned in a gate valve having a large diameter opening.

Furthermore, the guide pin 62 is also applicable to a valve plate having a specific configuration.

[Wipers 53 and 54]

Circular ring-shaped wipers 53 and 54 are provided on the outer-peripheral face of the fixed valving section 50, and the wipers come into contact with the inner-peripheral face of the movable valving section 60.

Specifically, the wiper 53 is provided at the first outer-peripheral face 50*b* which is located on the outer side in the radial direction and on the outer-crank portion of the fixed valving section 50.

Furthermore, the second outer-peripheral face 50*c* is located at the inside of the first outer-peripheral face 50*b* in the radial direction and under the wiper 53, and the wiper 54 is provided on the second outer-peripheral face 50*c*.

The wiper 53 is in contact with the first inner-peripheral face 60*b* of the movable valving section 60, and the wiper 54 is in contact with the second inner-peripheral face 60*c*. The second inner-peripheral face 60*c* is located under the first inner-peripheral face 60*b* of the movable valving section 60.

Both the wipers 53 and 54 are disposed on the outer-peripheral face of the fixed valving section 50.

The second seal portion 51*a* is disposed at the position close to the first opening portion 12*a* (first space).

The third seal portion 52*a* is disposed at the position close to the second opening portion 12*b* (second space).

Such wipers 53 and 54 lubricate the inner-peripheral face of the movable valving section 60 sliding in accordance with the valve opening operation and the valve closing operation or make it clean, and possesses a function of preventing dust from discharging to the first space and the second space. The dust is generated due to the aforementioned sliding motion or generated from the second biasing section 80.

Additionally, when, for example, a sponge-like porous elastic body is selected as elements (materials) used to form the wipers 53 and 54, it is possible to infiltrate (holding) lubricant into the inside of the elements.

Accordingly, it is possible to maintain a state where a thin oil film having a constant film thickness is formed on the sealing surface sealed by the second seal portions 51*a* and 51*b* and the third seal portions 52*a* and 52*b*.

Particularly, the wipers 53 and 54 wipe excessive oil film, and apply an oil film having a constant film thickness when the oil film is depleted.

[Intermediate Air Chambers 55, 56]

An intermediate air chamber 55 serving as an atmospheric pressure space (air space) is provided on the outer-peripheral face of the fixed valving section 50 which is partitioned by the second seal portions 51*a* and 51*b*.

Similarly, an intermediate air chamber 56 serving as an atmospheric pressure space (air space) is provided on the outer-peripheral face of the fixed valving section 50 which is partitioned by the third seal portions 52*a* and 52*b*.

Specifically, the intermediate air chamber 55 is provided on the first outer-peripheral face 50*b* which is located on the outer side in the radial direction on the outer-crank portion of the fixed valving section 50.

Furthermore, the intermediate air chamber 56 is provided on the second outer-peripheral face 50*c* which is located under the intermediate air chamber 55 and on the inner side of the first outer-peripheral face 50b in the radial direction.

The intermediate air chamber 55 is the space between the first inner-peripheral face 60b of the movable valving section 60 and the groove provided on the first outer-peripheral face 50b, and the intermediate air chamber 56 is the space between the second inner-peripheral face 60c located under the first inner-peripheral face 60b of the movable valving section 60 and the groove provided on the second outer-peripheral face 50c.

Consequently, the pressure inside such intermediate air chambers 55 and 56 can be monitored.

That is, a pressure gauge is provided at the gate valve 100 so as to measure the pressure inside the intermediate air chambers 55 and 56, and the pressure is monitored by an user.

In a case where, for example, the first space close to the first opening portion 12a is a decompression space and the second seal portion 51a is damaged, the pressure inside the intermediate air chamber 55 becomes lower than atmospheric pressure.

Furthermore, the pressure inside the cylinder (second biasing section 80) to which compressed air is supplied is higher than atmospheric pressure, Therefore, if the second seal portion 51b is damaged, the pressure inside the intermediate air chamber 55 will become higher than atmospheric pressure.

Similarly, the second space close to the second opening portion 12b is a decompression space and the third seal portion 52a is damaged, the pressure inside the intermediate air chamber 56 becomes lower than atmospheric pressure.

Furthermore, the pressure inside the cylinder (second biasing section 80) to which compressed air is supplied is higher than atmospheric pressure. Therefore, if the third seal portion 52b is damaged, the pressure inside the intermediate air chamber 56 will become higher than atmospheric pressure.

Accordingly, since the gate valve 100 has the constitution monitoring the pressures inside the intermediate air chambers 55 and 56, Therefore, if, for example, the pressures inside the intermediate air chambers 55 and 56 are lower than atmospheric pressure and are lower than a threshold pressure value, or the pressures inside the intermediate air chambers 55 and 56 are higher than atmospheric pressure and are higher than a threshold pressure value, it is possible to detect an abnormality in the second seal portions 51a and 51b and the third seal portions 52a and 52b.

When, for example, a constitution in which an alarm device provided is at the gate valve 100 or a constitution in which an alarm device is provided at a control device connected to the gate valve 100 is adopted, it is possible to inform of an abnormalities in the second seal portions 51a and 51b and the third seal portions 52a and 52b.

Therefore, it is possible to promptly know that the second seal portions 51a and 51b and the third seal portions 52a and 52b are damaged, internal leakage is generated in the gate valve 100, and maintenance is thereby required.

Consequently, a failure such as an internal leakage generated in the gate valve that an exterior vacuum apparatus or the like cannot detect can reliably be determined.

As described above, the valve plate 40 that is constituted of the fixed valving section 50 and the movable valving section 60 surrounding the outer-periphery of the fixed valving section 50 is provided in the first embodiment.

Additionally, the first biasing sections 70 (spring) are provided at the peripheral region of the valve plate 40, and the first biasing sections 70 perform a valve closing operation by transferring the movable valving section 60 to the first opening portion 12a.

Furthermore, the second biasing section 80 (air cylinder) is provided which performs a valve opening operation by transferring the movable valving section 60 toward the second opening portion 12b.

With this configuration, one valve plate 40 and two biasing sections can form a valving element.

Furthermore, the movable valving section 60 is directly pressed onto the inner surface of the valve box 10 by the restorative force generated in the first biasing sections 70 that are arranged at the peripheral region of the valve plate 40, and it is thereby possible to reliably close the valve.

Similarly, due to the action of the compressed air which is supplied to the second biasing section 80 disposed around the second peripheral region 40b of the valve plate 40, the movable valving section 60 moves separately from the inner surface of the valve box 10, and it is thereby possible to reliably open the valve.

For this reason, in the first embodiment, it is possible to realize a gate valve which have a simple structure and can perform a separating operation with a high level of reliability.

Second Embodiment

Figure 3:
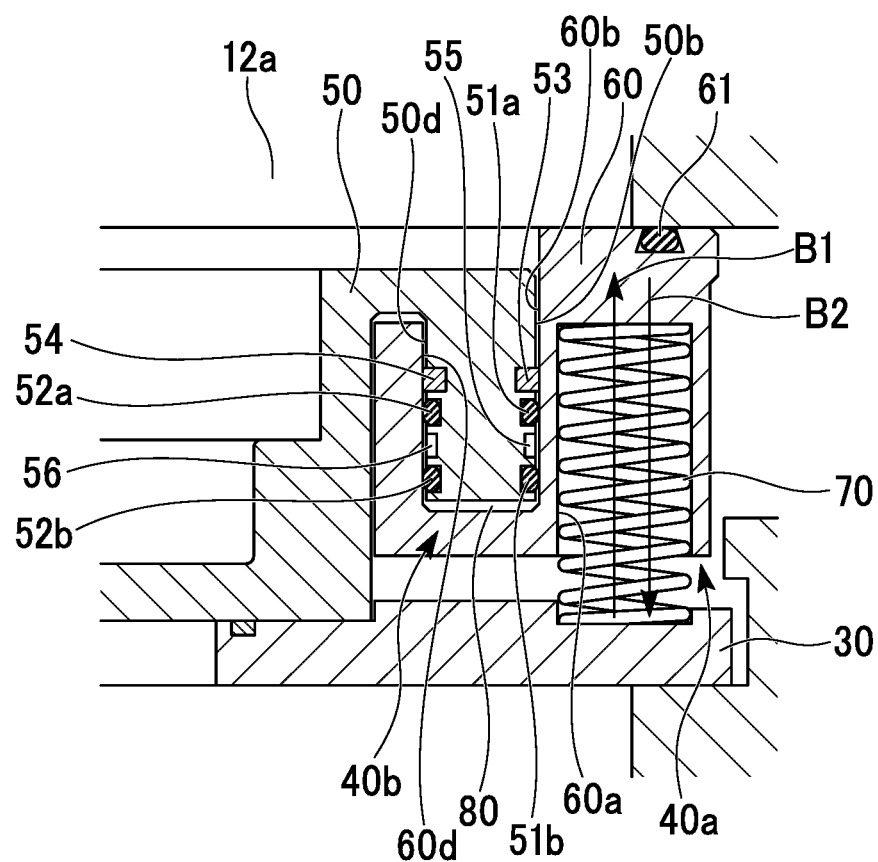
FIG. 3 is an enlarged vertical cross-sectional view showing the portion at which a fixed valving section is fitted to a movable valving section in the gate valve of a second embodiment of the invention.

FIG. 3 shows a gate valve of a second embodiment of the invention, and is an enlarged vertical cross-sectional view showing the portion at which a fixed valving section is fitted to a movable valving section.

In FIG. 3, identical symbols are used for the elements which are identical to those of FIGS. 1A and 1B or FIG. 2, and the explanations thereof are omitted or simplified.

In a gate valve of a second embodiment, the portion at which the fixed valving section 50 and the movable valving section 60 of the above-described gate valve 100 of the first embodiment (refer to FIG. 1A, 1B, or 2) are fitted to each other is modified, and the thickness of the valve plate 40 decreases.

In the structure of the valve plate 40 of the aforementioned first embodiment, as shown in FIG. 2, the outer-crank portion formed around the outer-periphery of the fixed valving section 50 is fitted into the inner-crank portion formed on the inner-periphery of the movable valving section 60.

On the other hand, in the second embodiment, a U-shaped portion having a U-shape configuration is formed around the outer-periphery of the fixed valving section 50, and an inverted U-shaped portion having an inverted U-shape configuration is formed around the inner-periphery of the movable valving section 60.

Additionally, the fixed valving section 50 and the movable valving section 60 are provided such that the U-shaped portion of the fixed valving section 50 is fitted into the inverted U-shaped portion of the movable valving section 60.

In the second embodiment, positions of a third seal portion 52b, an intermediate air chamber 56, a third seal portion 52a, and a wiper 54 are different from that of the first embodiment.

Specifically, the third seal portion 52b, the intermediate air chamber 56, the third seal portion 52a, and the wiper 54 are provided on the second outer-peripheral face 50c in the first embodiment; however, the third seal portion 52b, the intermediate air chamber 56, the third seal portion 52a, and the wiper 54 are provided on an inner-side face 50d which is opposite to the first outer-peripheral face 50b in the second embodiment.

Furthermore, the movable valving section 60 has an opposed face 60d facing the first inner-peripheral face 60b.

The third seal portions 52a and 52b, and the wiper 54 which are provided on the inner-side face 50d are in contact with the opposed face 60d.

In addition, the intermediate air chamber 56 that is provided in the inner-side face 50d is the space between the opposed face 60d and the groove provided at the inner-side face 50d.

As described above, according to the second embodiment, the same effects as in the aforementioned first embodiment is obtained.

Furthermore, in the second embodiment, since the thickness of the valving element can be narrowed down, the gate valve of the second embodiment is effectively applicable when it is not possible to sufficiently ensure the height of the gate valve such as when the gate valve is disposed in a narrow space in a vacuum apparatus or the like.

Third Embodiment

FIGS. 4A and 4B are views illustrating the constitution of the gate valve of the third embodiment of the invention.

FIG. 4A is a horizontal cross-sectional view showing a gate valve, and FIG. 4B is a vertical cross-sectional view showing the gate valve when the valving element is disposed at the valve opening-closing position.

In FIGS. 4A and 4B, identical symbols are used for the elements which are identical to those of FIGS. 1A and 1B, and the explanations thereof are omitted or simplified.

A gate valve 300 of a third embodiment is provided with a valve box 10a, a valve rod 25, a support body 30, a valve plate 40, first biasing sections 70 (spring), and a second biasing section 80 (air cylinder).

The support body 30 and the valve plate 40 constitute the valving element.

Additionally, the valve plate 40 is constituted of a fixed valving section 50 and a movable valving section 60.

[Direct Acting Gate Valve]

The gate valve 300 of the third embodiment is a direct acting gate valve.

In the gate valve 300, the valving element structure constituting the pendulum gate valve 100 of the above-described first embodiment is applied to a direct acting gate valve.

The configurations of the first opening portion 12a, the second opening portion 12b, and the valve plate 40 (fixed valving section 50 and movable valving section 60) are concentric circle in the above-described first embodiment. However, in the third embodiment, the configuration thereof and the configuration of the support body 30 are substantially regular tetragon such that the corner portions thereof are rounded.

Moreover, in order to allow the valving element to move in a straight direction, the horizontal cross-sectional shape of the valve box 10a is substantially rectangular.

The support body 30 is securely fixed to the end of the valve rod 25.

When the valve rod 25 is driven so as to travel in the direction indicated by reference numeral D1, the support body 30 also moves straight in accordance with this driving along the direction D1.

As stated above, due to the support body 30 moving straight, the valve plate 40 is inserted into the valve opening-closing position of the flow passage H from the safety position at which the flow passage H is not provided.

Consequently, the valve plate 40 closes the flow passage H by operating the first biasing sections 70 (valve closing operation).

Conversely, after the valve plate 40 is opened by operating the second biasing section 80 (valve opening operation), when the valve rod 25 is driven so as to move straight in the direction D2, the support body 30 also moves straight in accordance with this motion in the direction D2.

For this reason, the valve plate 40 moves to the safety position from the aforementioned valve opening-closing position.

As described above, according to the third embodiment, the same effects as in the aforementioned first embodiment is obtained in the direct acting gate valve.

Fourth Embodiment

Figure 5A:
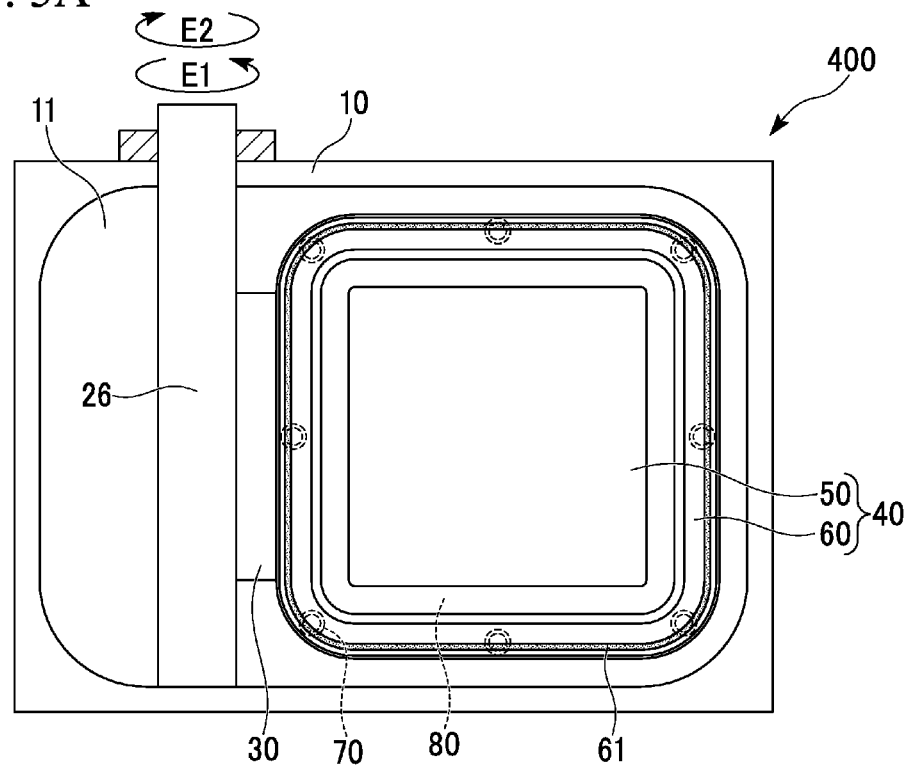
FIG. 5A is a horizontal cross-sectional view showing the constitution of a gate valve of a fourth embodiment of the invention.
Figure 5B:
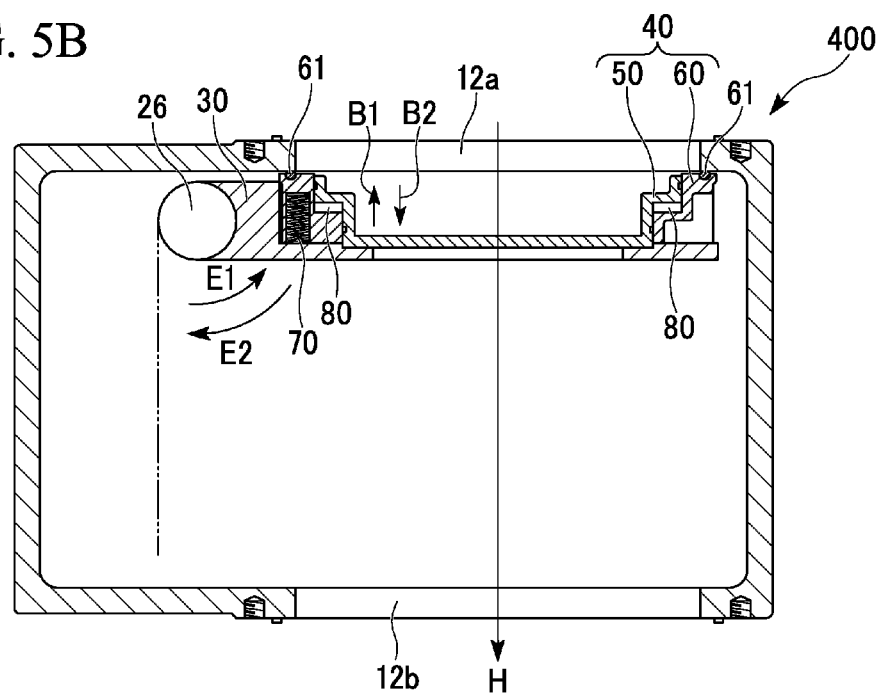
FIG. 5B is a vertical cross-sectional view showing the constitution of the gate valve of the fourth embodiment of the invention and is a view showing the case where a valving element is placed at a valve opening-closing position.

FIGS. 5A and 5B are views illustrating the constitution of the gate valve of the fourth embodiment of the invention.

FIG. 5A is a horizontal cross-sectional view showing a gate valve, and FIG. 5B is a vertical cross-sectional view showing the gate valve when the valving element is disposed at the valve opening-closing position.

In FIGS. 5A and 5B, identical symbols are used for the elements which are identical to those of FIG. 1A, 1B, 4A, or 4B, and the explanations thereof are omitted or simplified.

A gate valve 400 of a fourth embodiment is provided with a valve box 10b, a valve shaft 26, a support body 30, a valve plate 40, first biasing sections 70 (spring), and a second biasing section 80 (air cylinder).

The support body 30 and the valve plate 40 constitute the valving element.

Additionally, the valve plate 40 is constituted of a fixed valving section 50 and a movable valving section 60.

[Door Gate Valve]

The gate valve 400 of the fourth embodiment is a door gate valve.

In the gate valve 400, the valving element structure constituting the direct acting gate valve 300 of the above-described third embodiment is applied to a door gate valve.

Consequently, in the gate valve 400 of the fourth embodiment, the valving element structure constituting the pendulum gate valve 100 of the aforementioned first embodiment is applied to the door gate valve, and the configurations of the support body 30 and the valve plate 40 is modified from concentric circle to substantially regular tetragon.

Moreover, the extension direction of the rotation shaft 20 coincides with the direction of the flow passage H in the first embodiment, however, the extension direction of the valve shaft 26 intersects with the direction of the flow passage H in the fourth embodiment.

In the pendulum gate valve 100 of the above-described first embodiment, the constitution in which the support body 30 having the rotation portion 30b expanding in parallel with the plane perpendicular to the rotation shaft 20 is securely fixed to the rotation shaft 20 is adopted.

On the other hand, in the door gate valve 400 of the fourth embodiment, the support body 30 having the surface parallel to the valve shaft 26 is securely fixed to the valve shaft 26.

When the valve shaft 26 is rotated in the direction indicated by reference numeral E1, the support body 30 is rotated along the direction E1 in accordance with this rotation.

Due to the rotation of the support body 30 in the above-described manner, the valve plate 40 is inserted into the valve opening-closing position of the flow passage H from the safety position at which the flow passage H is not provided.

Consequently, the valve plate 40 closes the flow passage H by operating the first biasing sections 70 (valve closing operation).

Conversely, when the valve shaft 26 is rotated in the direction indicated by reference numeral E2 after the valve plate 40 is opened by operating the second biasing section 80 (valve opening operation), the support body 30 is rotated in the direction E2 in accordance with this rotation.

Accordingly, the valve plate 40 moves to the safety position from the above-described valve opening-closing position.

The support body 30 that is disposed at the safety position is substantially perpendicular to the first opening portion 12a or the second opening portion 12b.

As described above, according to the fourth embodiment, the same effects as in the aforementioned first embodiment is obtained in the door acting gate valve.

In other cases, the constitution in which a spring is used as the first biasing section is described in the embodiments of the above-described invention; however, the other elastic body may be used.

Additionally, as the structure of the second biasing section, the constitution in which circular ring-shaped single air cylinder is employed is described; however, oil hydraulic cylinder or the like may be adopted.

A drive unit that allows the movable valving section 60 to move separately from the inner surface of the valve box 10 (10a, 10b) by driving single circular ring-shaped cylinder is used as the second biasing section.

Figure 6A:
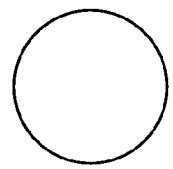
FIG. 6A is a view showing the configuration of an opening portion and a valve plate which are applicable to the gate valve of the embodiment of the invention.
Figure 6B:
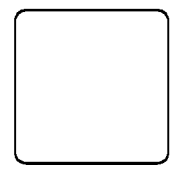
FIG. 6B is a view showing the configuration of an opening portion and a valve plate which are applicable to the gate valve of the embodiment of the invention.

Additionally, the opening portion and the valve plate which are formed in a circular shape as shown in FIG. 6A or the opening portion and the valve plate which are formed in a substantially regular tetragon shape such that the corner portions thereof are chamfered as shown in FIG. 6B are described in the embodiments of the above-described invention.

The gate valve of the invention is not limited to the shapes as shown in FIGS. 6A and 6B.

Figure 6C:
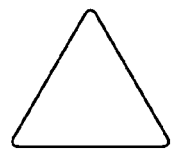
FIG. 6C is a view showing the configuration of an opening portion and a valve plate which are applicable to the gate valve of the embodiment of the invention.

Since the gate valve of the invention has a constitution in which an actuator is provided at the peripheral region of the valve plate, an opening portion and a valve plate, for example, which are formed in a substantially triangular shape having rounded corner portions as shown in FIG. 6C, may be adopted.

Figure 6D:
FIG. 6D is a view showing the configuration of an opening portion and a valve plate which are applicable to the gate valve of the embodiment of the invention.
Figure 6E:
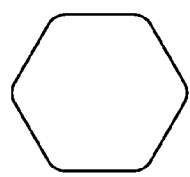
FIG. 6E is a view showing the configuration of an opening portion and a valve plate which are applicable to the gate valve of the embodiment of the invention.
Figure 6F:
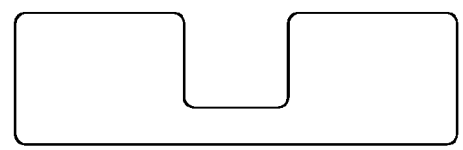
FIG. 6F is a view showing the configuration of an opening portion and a valve plate which are applicable to the gate valve of the embodiment of the invention.

Additionally, an opening portion and a valve plate, for example, which are formed in a substantially rectangular shape having rounded corner portions as shown in FIG. 6D, may be adopted. Additionally, an opening portion and a valve plate, for example, which are formed in a substantially hexagonal shape having rounded corner portions as shown in FIG. 6E, may be adopted. Additionally, an opening portion and a valve plate, for example, which are formed in a substantially U-shape having rounded corner portions as shown in FIG. 6F, can be applied.

Furthermore, opening portions and valve plates formed in any shape, such as an opening portion and a valve plate which are formed in a ellipsoidal shape, an opening portion and a valve plate which are formed in a substantially octagonal shape having rounded corner portions, or the like, are applicable to the invention.

INDUSTRIAL APPLICABILITY

The present invention is widely applicable to a gate valve used for separating a flow passage communicating two spaces in which the vacuum degrees thereof are different from each other in a vacuum apparatus or the like or used for releasing this separated state.

What is claimed is:
1. A gate valve comprising:
a valve box comprising: a hollow portion; a first opening portion and a second opening portion that are provided so as to sandwich the hollow portion; an inner surface formed around the first opening portion; and a flow passage passing through the hollow portion, the first opening portion, and the second opening portion;
a support body disposed inside the hollow portion;
a valve plate comprising: a fixed valving section that is securely fixed to the support body and has a first outer-peripheral face which is located on an outer side in a radial direction of the fixed valving section; a movable valving section disposed so as to surround the first outer-peripheral face of the fixed valving section; a first peripheral region; and a second peripheral region, the movable valving section sliding in a direction in which the flow passage is extended, the movable valving section comprising a first seal portion which is in contact with the inner surface and is pressed onto the inner surface;
a first biasing section disposed at the first peripheral region, allowing the movable valving section to move toward the first opening portion, allowing the movable valving section to come into contact with the inner surface, pressing the movable valving section onto the inner surface, and closing the flow passage, the first biasing section being an elastic element provided directly below the first seal portion in the movable valving section; and
a second biasing section disposed at the second peripheral region, allowing the movable valving section to move toward the second opening portion, and releasing the flow passage by separating the movable valving section from the inner surface.

2. The gate valve according to claim 1, wherein
the second biasing section is a single air cylinder which is formed between the fixed valving section and the movable valving section in the second peripheral region and which is ring-shaped.

3. The gate valve according to claim 1, wherein
the first biasing section is arranged in parallel with a direction in which the movable valving section slides and is located adjacent to the second biasing section.

4. The gate valve according to claim 1, wherein
the fixed valving section includes second seal portions, third seal portions, a second outer-peripheral face, a first intermediate air chamber, and a second intermediate air chamber,
the first intermediate air chamber is formed on the first outer-peripheral face and is partitioned by the second seal portions, and
the second intermediate air chamber is formed on the second outer-peripheral face and is partitioned by the third seal portions.

5. The gate valve according to claim 4, further comprising:
a pressure gauge provided to measure a pressure inside the first intermediate air chamber and the second intermediate air chamber.

6. The gate valve according to claim 4, further comprising:
circular ring-shaped wipers provided on the first outer-peripheral face and the second outer-peripheral face, wherein
the wipers come into contact with a first inner-peripheral face and a second inner-peripheral face of the movable valving section.

7. The gate valve according to claim 1, wherein
the fixed valving section includes second seal portions, third seal portions, an inner-side face which is opposite to the first outer-peripheral face, a first intermediate air chamber, and a second intermediate air chamber,
the first intermediate air chamber is formed on the first outer-peripheral face and is partitioned by the second seal portions, and the second intermediate air chamber is formed on the inner-side face and is partitioned by the third seal portions.

8. The gate valve according to claim 7, further comprising:
a pressure gauge provided to measure a pressure inside the first intermediate air chamber and the second intermediate air chamber.

9. The gate valve according to claim 7, further comprising:
circular ring-shaped wipers provided on the first outer-peripheral face and the inner-side face, wherein
the wipers come into contact with a first inner-peripheral face and an opposed face of the movable valving section.

10. The gate valve according to claim 1, wherein
the fixed valving section is exposed to both the first opening portion and the second opening portion in a state where the first opening portion is covered with the valve plate.

* * * * *